United States Patent

Dixon et al.

[15] 3,670,205

[45] June 13, 1972

[54] METHOD AND STRUCTURE FOR SUPPORTING ELECTRIC COMPONENTS IN A MATRIX

[72] Inventors: Corbin Dixon; John J. Larew, both of Waynesboro, Va.

[73] Assignee: General Electric Company

[22] Filed: March 25, 1970

[21] Appl. No.: 22,495

[52] U.S. Cl. ....................317/101 CE, 317/101 CM

[51] Int. Cl. ....................H05k 1/04

[58] Field of Search ..........317/101 CM, 101 CE, 101 CP; 339/18, 18 C, 17 M

[56] References Cited

UNITED STATES PATENTS

| | | | |
|---|---|---|---|
| 2,853,656 | 9/1958 | Dowds | 317/101 CP X |
| 2,872,664 | 2/1959 | Minot | 317/101 CE UX |
| 3,002,169 | 9/1961 | Kamm | 339/18 C UX |
| 3,290,756 | 12/1966 | Dreyer | 317/101 CM UX |

*Primary Examiner*—David Smith, Jr.

*Attorney*—Michael Masnik, Frank L. Neuhauser, Oscar B. Waddell and Joseph B. Forman

[57] ABSTRACT

Electric components are held at selected positions of a matrix defined by a plurality of rows and columns. An upper plate containing rows of conductors and a lower plate containing columns of conductors sandwich the components and complete a matrix structure wherein the components are securely held and are in good electrical contact with external circuitry.

6 Claims, 5 Drawing Figures

INVENTOR.
CORBIN DIXON
JOHN J. LAREW
BY Michael Masnik
THEIR ATTORNEY

METHOD AND STRUCTURE FOR SUPPORTING ELECTRIC COMPONENTS IN A MATRIX

FIELD OF THE INVENTION

This invention relates to a method of mounting electric components in a matrix and to a structure for carrying out the method; more particularly, it relates to a unique method and structure whereby one may selectively locate any desired number of electric components in selected positions within a matrix.

DESCRIPTION OF THE INVENTION

It has been known to rigidly mount diodes and other electric components in matrix configuration. One arrangement includes the use of a support plate holding the various elements in position. In some instances, pluralities of these support plates are arranged in sandwich form, and in other instances, the support plate has taken the form of a slideable member which may be interposed between planar elements containing selectively disposed conductive means. Heretofore, the matrix structures have had a number of disadvantages, including: excessive space requirements; relative electric inflexibility of the structure; utilization of more components per unit than are necessary from a circuit standpoint; and undue complexity of circuit interconnections.

SUMMARY OF THE INVENTION

The present invention provides a method of matrix assembly offering flexibility in terms of both electrical interconnection and component employment. In doing so, many disadvantages of the prior art are overcome.

It is an object of the invention to provide an improved method for storage and interconnection of electrical components within a matrix.

It is another object of the present invention to provide an improved matrix structure providing flexibility of circuit interconnection and component usage.

Another object of the invention is to provide an improved electrical component matrix structure wherein the components are soft mounted and may be removed and replaced at will.

Another object of the invention is to provide an improved electrical component matrix structure wherein the components may be positioned at will within the matrix in accordance with any desired circuit program.

According to one embodiment of the invention there is provided a method of connecting electric components in random positions within a predefined matrix, where said components are of predetermined length with end connectors, comprising: establishing a first array of geometrically related conductors in a first plane, said conductors being spaced apart by a predetermined amount; establishing a second array of geometrically related conductors in a second plane, said conductors being spaced apart by a predetermined amount; positioning the first and second arrays in respective surfaces separated by slightly less than the predetermined length of the components; and positioning the components between selected intersections of the conductors in the first and second arrays, whereby the components complete a circuit between the conductors at the selected intersection.

In accordance with another aspect of the invention, there is provided a matrix assembly for electric components of predetermined length having end connectors, comprising: a support plate having apertures therethrough arranged in rows and columns, and having a thickness slightly less than the length of said electric components; a nonconductive upper plate having electrically conductive material arranged in rows in facing relation to one face of the support plate with each row in registration with a row of the apertures; a nonconductive lower plate having electrically conductive material arranged in columns in facing relation to the second face of the support plate with each column in registration with a column of the apertures; the electric components being removably positioned in selected apertures and being held in compression between the upper and lower plates; and means for securing the plates in a sandwich arrangement.

A complete appreciation and understanding of the invention will be available from the following detailed description of several preferred embodiments. This detailed description is made in conjunction with the drawings.

DESCRIPTION OF THE PREFERRED EMBODIMENTS

It is contemplated that the method of the present invention will be particularly effective in the establishment of diode matrices; however, those familiar with the electronic art will immediately recognize the applicability to other electrical components. A basic feature of the invention lies in the fact that the components must have a predetermined length and a radial or cross-sectional configuration, no greater than a prescribed amount. Furthermore, each component must be substantially rigid along its longitudinal axis and be adapted for electrical contact at its end portions.

The components are positioned with their axes in parallel at selected intersections of a matrix defined by a plurality of rows and columns. A first array of parallel conductors, each coincident with one of said rows, is positioned across one end of the components. A second array of parallel conductors, each coincident with one of said columns, is positioned across the other end of the components. The arrays are maintained in positions relative to one another, such that some compression is exerted along the axes of the components. In this way, the components are securely held in good electric contact with the arrayed conductors. The compression may be enhanced by selective fabrication or backing of the conductors.

Figures 1, 2, 5:
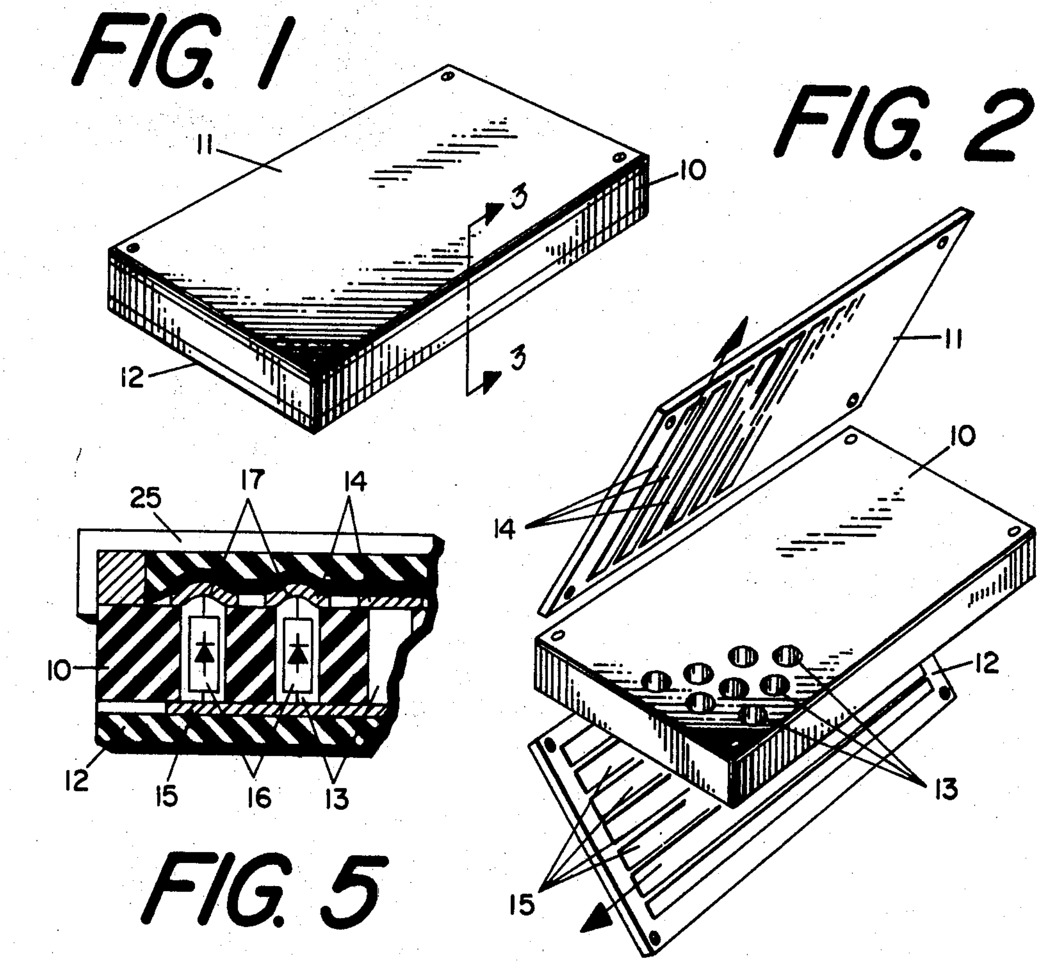
FIG. 1 is a perspective view of an enclosed matrix structure of the type contemplated by the present invention.
FIG. 2 is an exploded view of a matrix structure illustrating the features of a first embodiment of the invention.
FIG. 5 shows the arrangement of FIG. 4 in cross section.

FIG. 1 illustrates a basic component support structure 10 having upper nonconductive plate 11 and lower nonconductive plate 12 serving as covers therefor. The nonconductive support plate 10 is, in fact, the means for maintaining selected diodes in a number of preselected positions. This will be more clearly appreciated from a consideration of FIG. 2.

As shown in FIG. 2, support plate 10 has a plurality of apertures 13 which are arranged in rows and columns. Each of apertures 13 completely pierces the support plate 10. The apertures are arranged in circumferential configuration to conform with the external shape of conventional electric components. These elements may be of cylindrical form and have conductors projecting from each end of the cylinder. It is contemplated that the cylinder and end conductors are relatively rigid and that the total length of each component with its projecting conductors will be of a dimension greater than the thickness of supporting plate 10 as will be described. The outer diameter of the components is smaller than the diameter of apertures 13. It is to be understood that the apertures serve to confine the components in a desired mounting position; however, they do not secure the elements in position. Thus, the elements may be removed at will.

The upper plate of the matrix assembly contains a plurality of conductive elements 14 arranged thereon in successive columns. Each conductor is positioned to place it directly over a column of apertures in the support plate 10. In a first embodiment of the invention, it is contemplated that the conductors 14 will be of a depressible nature and will provide some degree of depression into the backing of upper element 11. The lower layer 12 is similar in construction to layer 11; however, flexible conductors 15 are positioned on layer 12 in an arrangement which will provide juxtaposition with the various rows of apertures in structure 10. Thus, when the entire structure is assembled, the conductors 14 and 15 will appear on one or the other end of each aperture. Contact to other circuits may be made from conductors 14 and 15 as shown by the arrows.

Figure 3:
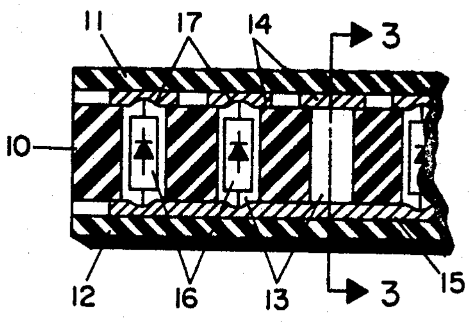
FIG. 3 is a vertical cross-sectional view taken along line 3—3 of FIG. 1, showing a portion of a matrix structure containing several diode elements mounted in accordance with the embodiment of the invention shown in FIG. 2.

Referring to the cross-sectional view in FIG. 3, it will be seen that when the structure is fully assembled, the relative length of the diode elements 16 with their extending end connectors is such that they will bear against flexible conductor elements 14 and 15 which have been purposely provided with a degree of resiliency. In one embodiment, elements 14 and 15 were formed of conductive, resilient rubber strips. Thus, the diode elements cause a slight deformation of the conductors at the point of contact and in so doing generate a secure seating condition and effect a reliable electrical connection. Plates 11 and 12 are removably held in position by any convenient means. It will be apparent also from FIG. 3 that each aperture need not be filled by a diode element, and in fact apertures may be left vacant in accordance with the circuit requirements of the particular matrix. In utilizing the matrix structure of this invention, electrical connections are made to any desired ones of the conductive strips in any desired manner.

Figure 4:
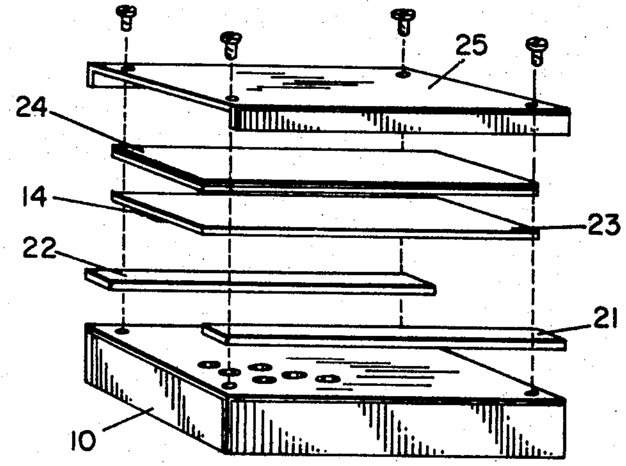
FIG. 4 is an exploded view of the upper elements of a matrix structure illustrating the features of a second embodiment of the invention.

FIG. 4 illustrates another embodiment of the present invention wherein the required compression for assuring secure mounting and effective electrical contact is obtained in a slightly different fashion. This figure illustrates only the upper portion of the assembly and it should be understood that a similar array of elements may appear below support structure 10. The exploded view reveals noncompressible spacer shims 21 and 22 which are disposed along opposite edges of the support structure 10. Alternatively, shims 21 and 22 could be integral with support structure 10 or with cover member 25. Between these spacer shims 21, 22, there is a non-conductive flexible sheet 23 which serves as the substrate for mounting conductive film strips 14 on the lower face thereof. These conductive film strips are arranged in rows and columns as previously described. The element 24 is a nonconductive, resilient member and may be formed of rubber or the like. The purpose of this element is to provide the axial compression required for accurate positioning and reliable contact of the electrical components. The final element in the stack shown in FIG. 4 is a cover member 25 which is adapted to confine the previously described elements in a conventional fashion.

Thus referring to FIG. 5, an electrical component or connection lead such as that associated with 16 protrudes through the apertures of 10 and depresses the flexible conductors 14 and associated flexible insulating sheet 23 into the resilient, nonconductive member 24. The restoring forces associated with the resilience of 24 maintain the necessary contact pressure between the lead ends and the flexible conductors to insure good conductive contact while accommodating tolerance differences in the lead lengths. The shims are dimensioned to be slightly thinner than the combined thickness of rubber 24 and sheet 23 in the nondepressed states to establish the desired contact pressure during the depressed states.

There have been described several structures for providing a unique diode matrix system. When utilizing these structures, it becomes possible to variably position electrical components at any location throughout the described matrix. Also, in certain applications it may be desirable to have the first array comprise one or a plurality of separate conductors arranged in a first geometric pattern, such as skewed or parallel skewed or even curvilinear lines, or a combination thereof. The second array may comprise a plurality of separate conductors arranged in a second geometric pattern - similar or dissimilar to the first-mentioned pattern. The coupling electrical components are arranged to intercouple selected conductor or conductors in the first array with selected conductor or conductors in the second array.

It is appreciated that specific reference has been made hereinbefore to diode elements. The matrix method and structure may also be adapted for the confinement and positioning of other electrical components and it is contemplated that such components and their positioning come within the scope of the present invention. Further modifications may also be made by those skilled in the art without departing from the spirit or teachings of this disclosure and it is intended to embrace all such modifications within the scope of the following claims.

What we claim as new and desire to secure by Letters Patent of the United States is:

1. A matrix assembly for electric components of predetermined length having end connectors, comprising: a support plate having apertures therethrough arranged in rows and columns, said support plate having a thickness slightly less than the length of said electric components; a nonconductive upper plate having electrically conductive material arranged in rows in facing relation to one face of said support plate with each row in registration with a row of said apertures; a nonconductive lower plate having electrically conductive material arranged in columns in facing relation to the second face of said support plate with each column in registration with a column of said apertures; the conductive material associated with at least one of said plates also being flexible; said electric components being removably positioned in selected apertures, the conductive material of at least one of said upper or lower plates being formed of resilient rubber-like material which deforms to exert a resilient axial force against any electrical component in contact therewith at the point of contact with said end connectors; and means for securing said plates in a sandwich arrangement.

2. A matrix assembly as defined in claim 1, wherein said electric components are of substantially cylindrical form and have known radial dimensions, and the dimensions of the apertures in said support plate are slightly greater than the respective radial dimensions of said components.

3. An electrical circuit comprising a perforated block of electrical insulation material, said block having side faces, means for supporting a first group of flexible spaced apart conductors adjacent one of said side faces, means for supporting a second group of flexible spaced apart conductors adjacent the other of said side faces, spaced from and transverse to said first group of conductors, the perforations in said block being dimensioned and arranged in a pattern such that each perforation exposes a respective portion of a conductor of said first group to a respective portion of a conductor of said second group, each of said perforations adapted to receive a two terminal electrical component for making individual pressure contact between a conductor of said first group of conductors and a conductor of said second group of conductors through the terminals of said component, means for detachably assembling said groups of conductors in physical contact with said block to cause said component to make said pressure contact, at least one of said group of flexible conductors being made of resilient rubber-like material such that the terminals of said component in bearing against the flexible conductors of said one group cause such conductors to flex and deform and thereby securely seat said terminals in conductive contact with conductors of said first and second group of conductors.

4. An arrangement according to claim 3 wherein one of said groups of flexible conductors is backed up by a nonconductive resilient substrate providing said degree of resilience.

5. An electrical circuit comprising a perforated block of electrical insulation material, said block having parallel planar side faces, means for supporting a first group of flexible, parallel spaced conductors adjacent one of said side faces, means for supporting a second group of flexible, parallel spaced conductors adjacent the other of said side faces, spaced from and transverse to said first group of conductors, the perforations in said block being arranged in rows and columns such that each perforation exposes a respective portion of a conductor of said first group to a respective portion of a conductor of said second group in accordance with a predetermined code, each of a respective two terminal, an electrical component supported in each perforation for making individual contact between the associated conductor of said first group of conductors and the associated conductor of said second group of conductors through the terminals of said component, means for detacahably assembling said groups of conductors in physical contact with said block to cause sdaid component to make said pressure contact, at least one of said group of conductors being made of resilient rubber-like material such that the terminals of said components in bearing against the flexible conductors of said one group cause such conductors to flex and deform and thereby securely seat said terminals in conductive contact with conductors of said first and second group.

6. An arrangement according to claim 5 wherein both of said groups of conductors have a degree of resiliency enabling them to deflect in response to component terminal pressure to insure good electrical contact with said terminals.

* * * * *